United States Patent
Laur et al.

(10) Patent No.: US 8,901,910 B2
(45) Date of Patent: Dec. 2, 2014

(54) SYSTEM AND METHOD OF PREDICTIVE CURRENT FEEDBACK FOR SWITCHED MODE REGULATORS

(75) Inventors: Steven P. Laur, Raleigh, NC (US); M. Jason Houston, Cary, NC (US); Rhys S. A. Philbrick, Cary, NC (US); Thomas A. Jochum, Durham, NC (US)

(73) Assignee: Intersil Americas LLC, Milpitas, CA (US)

( * ) Notice: Subject to any disclaimer, the term of this patent is extended or adjusted under 35 U.S.C. 154(b) by 169 days.

(21) Appl. No.: 13/531,751

(22) Filed: Jun. 25, 2012

(65) Prior Publication Data

US 2013/0300388 A1 Nov. 14, 2013

Related U.S. Application Data

(60) Provisional application No. 61/646,007, filed on May 11, 2012.

(51) Int. Cl.
*G05F 1/00* (2006.01)
(52) U.S. Cl.
USPC .......................................................... 323/285

(58) Field of Classification Search
USPC .................................. 323/222, 271, 282–285
See application file for complete search history.

(56) References Cited

U.S. PATENT DOCUMENTS

| | | | |
|---|---|---|---|
| 7,372,241 B1 * | 5/2008 | Tomiyoshi | 323/288 |
| 8,482,271 B2 * | 7/2013 | Prodic et al. | 323/285 |
| 2009/0108824 A1 * | 4/2009 | Chen | 323/285 |
| 2009/0184701 A1 * | 7/2009 | Yen | 323/283 |

* cited by examiner

*Primary Examiner* — Nguyen Tran
(74) *Attorney, Agent, or Firm* — Gary Stanford

(57) ABSTRACT

A predictive current feedback system for a switched mode regulator including a sample and hold network for sampling voltage across a lower switch of the regulator and for providing a hold signal indicative thereof, and a predictive current feedback network which adds an offset adjustment to the hold signal based on a duration of a pulse width of a pulse control signal developed by the regulator. Sampling may be done while the lower switch is on for providing a hold value indicative of inductor current while the pulse control signal is low. The offset adjustment may be added to the hold signal in response to a transient event when the pulse signal is high. The offset may be incremental values after each of incremental time periods after a nominal time period, or may be a time-varying value. Adjustment may be made while the pulse signal is low as well.

15 Claims, 4 Drawing Sheets

SYSTEM AND METHOD OF PREDICTIVE CURRENT FEEDBACK FOR SWITCHED MODE REGULATORS

CROSS-REFERENCE TO RELATED APPLICATIONS

This application claims the benefit of U.S. Provisional Application Ser. No. 61/646,007, filed on May 11, 2012, which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

Figure 1:
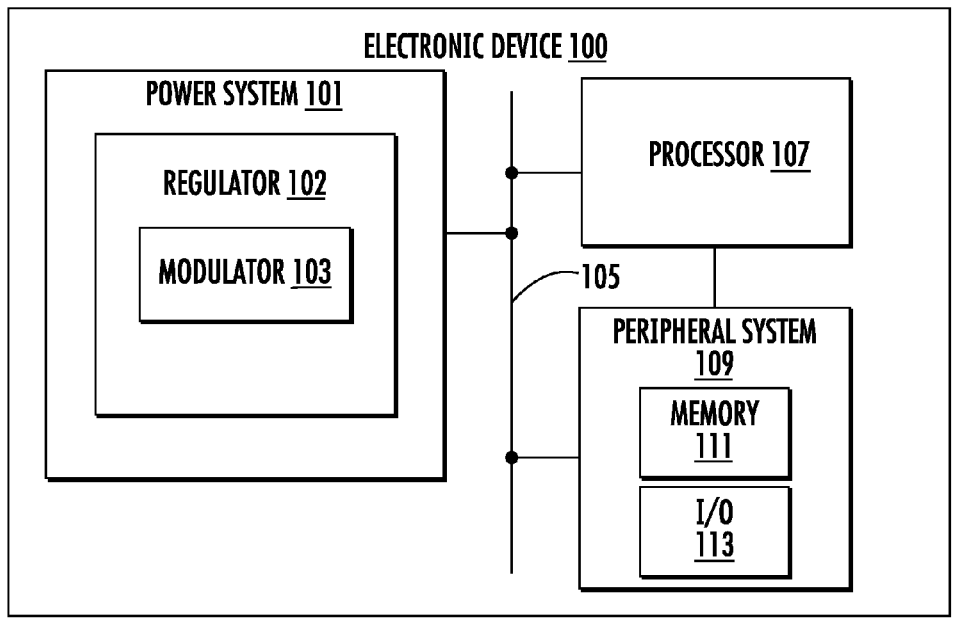
FIG. 1 is a simplified block diagram of an electronic device configured with a power system having a regulator with a modulator implemented with predictive current feedback according to an embodiment of the present invention.

The benefits, features, and advantages of the present invention will become better understood with regard to the following description, and accompanying drawings. The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The current through the output inductor of a switched mode regulator is a parameter that is useful for various functions, such as, for example, output voltage droop, loop regulation, current monitoring and/or reporting (IMON), etc. There have been many methods of sensing, measuring or otherwise predicting the inductor current.

One method of determining the inductor current is to detect or measure the voltage across the series DC resistance (DCR) of the output inductor. DCR sensing has several drawbacks and deficiencies. Since the output inductor is typically provided external relative to the regulator control integrated circuit (IC), DCR sensing typically requires additional external components to be coupled to the output inductor for purposes of detecting the voltage across the DCR. For example, an external resistor-capacitor (RC) circuit is coupled to the output inductor and the terminals of the external capacitor of the RC circuit are used to detect inductor current. DCR sensing also typically requires NTC (negative temperature coefficient) compensation for thermal drift, so that the network should be tuned and thermally compensated. NTC compensation increases system complexity and cost for the power supply designer.

Another method of sensing the inductor current is to provide a sensing resistor in series with the output inductor. Discrete sensing resistors are costly and insert a lossy element in the power train thereby reducing overall power conversion efficiency.

A buck-type regulator typically includes a pair of electronic devices having their current terminals (e.g., drains, sources) coupled in series between an input voltage VIN and a reference voltage, such as ground. The electronic switches may be implemented as any suitable type of transistor, such as, for example, a metal-oxide semiconductor (MOS) transistor, a field-effect transistor (FET), a MOSFET, a bipolar junction transistor (BJT) and the like, an insulated-gate bipolar transistor (IGBTs) and the like, etc. High side sensing (e.g., sensing the voltage across the high side FET) is difficult internally (i.e., within the control chip). A high voltage pilot or differential sense method is typically used and should be as accurate as possible. High side sensing is a floating signal that should be re-referenced to ground.

Piloted switches, such as scaled versions of the actual switching FETs, can produce scaled currents to those of the power device. It is difficult, however, to get accurate differential signals that have the appropriate common mode range (e.g., about 12V) and also have single digit nanosecond transition times.

Differential voltage measurements of the drain-source on-resistance ($R_{DS\_ON}$) of upper and lower FET switches have similar difficulties as piloted devices.

Sampling the $R_{DS\_ON}$ of the low side FET switch is less complex and lower cost than sampling both high and low side devices. It also allows a sufficient level of accuracy for the IMON function (e.g., reporting average inductor current to an external microprocessor, which is indicative of the load). Low side sensing is sufficient for the IMON function, but is typically not sufficiently fast for current feedback for the regulation or for properly implementing the output voltage droop function. In particular, the sampled signal has large error components due to sampling delays during load transients, including load insertion transients and load release transients.

As described herein, the gaps during load transient events may be estimated and "filled in" based on the sampled low side current information and the on time of the pulse width modulation (PWM) control signal. The inductor current level may be predicted during load transients between sampling events.

FIG. 1 is a simplified block diagram of an electronic device 100 configured with a power system 101 having a regulator 102 with a modulator 103 implemented with predictive current feedback according to an embodiment of the present invention. The power system 101 develops one or more supply voltages which provide power to other system devices of the electronic device 100. In the illustrated embodiment, the electronic device 100 includes a processor 107 and a peripheral system 109, both coupled to receive supply voltages from the power system 101 via a bus 105, which includes any combination of power and/or signal conductors. In the illustrated embodiment, the peripheral system 109 may include any combination of a system memory 111 (e.g., including any combination of RAM and ROM type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other type of electronic devices (e.g., media player, recording device, etc.). The power system 101 may be configured to include a battery (rechargeable or non-rechargeable) and/or may be configured to operate with an alternating current (AC) adapter or the like.

Figure 2:
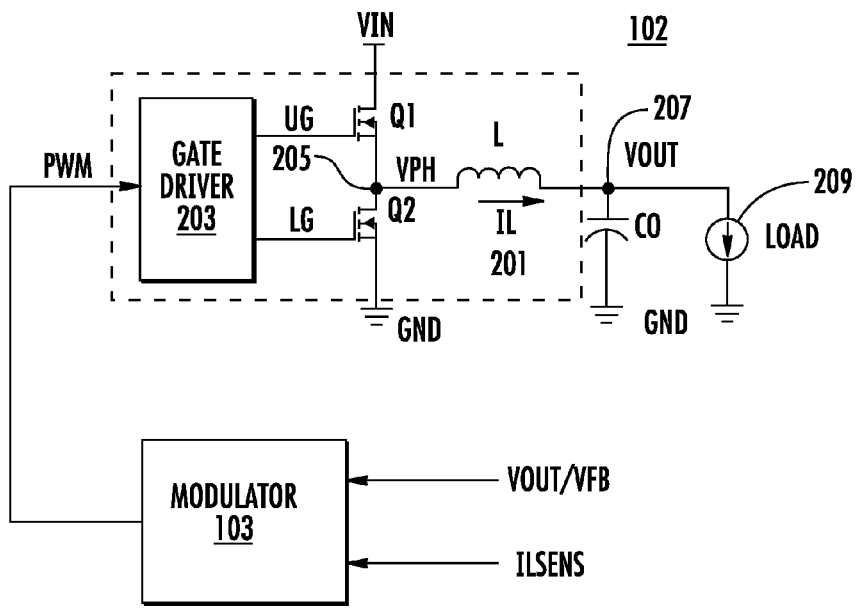
FIG. 2 is a simplified schematic and block diagram of an exemplary regulator including the modulator of FIG. 1 implemented according to one embodiment.

FIG. 2 is a simplified schematic and block diagram of an exemplary regulator 102 including the modulator 103 implemented according to one embodiment. The regulator 102 includes a phase circuit 201 which may be implemented for a single phase system or a multiphase system. The phase circuit 201 includes a gate driver 203 receiving a pulse width modulation signal PWM and providing a corresponding upper gate signal UG to an upper electronic power switch Q1 and a corresponding lower gate signal LG to a lower electronic power switch Q2. The power switches Q1 and Q2 have their current terminals (e.g., drains and sources) coupled series between an input voltage VIN and a common reference voltage GND (e.g., in which GND represents ground or any other suitable positive or negative reference voltage level). It is noted that GND may represent one or more reference nodes, including one or more ground levels or nodes, such as signal ground, power ground, chassis ground, etc., or any other suitable reference voltage level. The switches Q1 and Q2 are coupled together at an intermediate phase node 205 developing a phase voltage VPH, and an output inductor L has one end coupled to the phase node 205 and its other end coupled to an output node 207 developing an output voltage VOUT. An output capacitor CO and a load 209 are coupled between the output node 207 and GND. The load 209 represents any one or more of the load devices, such as the processor 107 and/or any of devices of the peripheral system 109.

The current IL through the inductor L is sensed simulated or otherwise synthesized and a corresponding inductor current sense signal ISENS is provided to a modulator 103. The modulator 103 receives VOUT and/or a feedback signal VFB indicative of VOUT and ILSENS and generates the PWM signal for controlling the phase circuit 201. VFB may be a sensed or proportional signal indicative of VOUT, such as developed by a voltage divider or the like (not shown). In operation, the modulator 103 uses ILSENS and VOUT (and/or VFB) and possibly other sensed signals or parameters and generates the PWM signal for purposes of loop regulation among other functions, such as IMON and voltage droop or the like. The gate driver 203 generates UG and LG based on PWM to turn on and off the electronic switches Q1 and Q2 to regulate the voltage level of VOUT.

The present invention is illustrated using a buck-type switched mode voltage converter as the switched mode regulator, in which the input voltage is greater than the output voltage. It is appreciated, however, that the present invention is equally applicable to other types of voltage converters, such as boost type converters (in which the output voltage is boosted higher relative to the input voltage), and various hybrid forms thereof, such as buck-boost and/or boost-buck and the like. It is readily apparent to those of ordinary skill in the art that sensing inductor current as described herein is equally applicable to any type of switched mode regulator.

Figure 3:
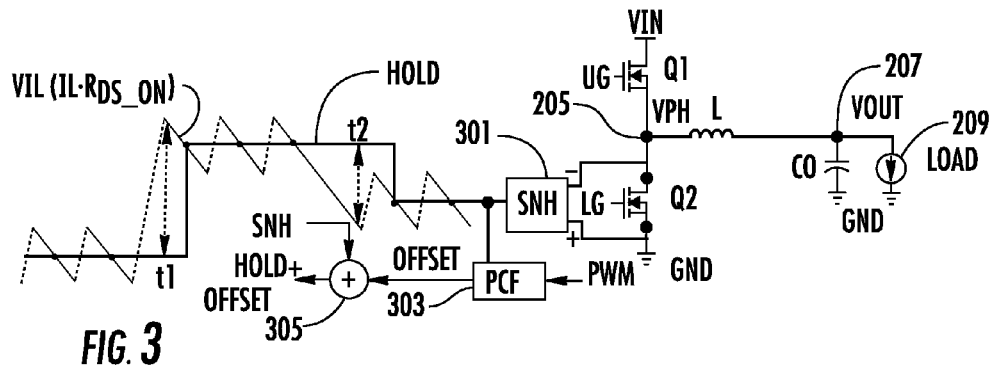
FIG. 3 is a schematic and block diagram and timing diagram depiction of a predictive current feedback system implemented according to one embodiment.

FIG. 3 is a schematic and block diagram and timing diagram depiction of a predictive current feedback system implemented according to one embodiment. The output stage of the regulator 102 is shown including the switches Q1, Q2, output inductor L, output capacitor CO and load 209. A sample and hold (SNH) network 301 has positive and negative polarity inputs coupled to the drain and source of Q2 (low side FET) to effectively sample the level of VPH when Q2 is turned on and to provide a corresponding HOLD signal at its output. The illustrated output of the SNH network 301 depicts an exemplary plot of the HOLD signal during operation and is superimposed with a corresponding voltage signal VIL representing inductor current when PWM is low. VIL is shown with dashed lines while PWM is high in which the voltage across Q2 is not directly monitored. VIL is shown with solid lines while the voltage across Q2 is being sampled while it is on. In general, when PWM goes high, Q1 is turned on while Q2 is turned off coupling the phase node 205 and thus the input side of the inductor L to the input voltage VIN causing the inductor current to ramp up. When PWM goes low, Q1 is turned off while Q2 is turned on coupling the phase node 205 to GND causing the inductor current to ramp down.

VIL is generally derived as the $R_{DS\_ON}$ of Q2 multiplied by inductor current IL, or VIL=IL·$R_{DS\_ON}$. VIL thus represents the inductor current IL when PWM is low. VIL is shown in dashed lines while PWM is on since this portion of VIL is not sampled. When PWM is turned off and Q2 is turned on, the voltage across Q2 is sampled by the SNH network 301 and then a sampled value is held at its output until the next held value is output. In general, the duration of the on-time of Q2 during sampling has a nominal time period during steady state conditions, in which the SNH network 301 outputs a held sample value at about the middle of the nominal time period. Dots along the HOLD signal represent when each hold value is completed during sampling to form the HOLD signal.

The SNH network 301 only samples VIL when Q2 is on while PWM is low to develop the HOLD signal. Initially while the load is low, the HOLD signal is generally accurate and follows the DC level of VIL (without the ripple). In response to a load insertion transient, however, VIL jumps up to a higher level while the HOLD signal remains held at the lower level as shown at time t1. The PWM signal remains on longer causing VIL to increase to a higher level. Since Q2 remains off, HOLD is held at the previously sampled level, which results in a large discrepancy or error between HOLD and VIL as shown at time t1. When PWM is finally pulled low and Q2 is turned back on, VIL is sampled once again by the SNH network 301 and another hold value is output which causes HOLD signal to jump to a higher level.

A similar discrepancy between HOLD and VIL occurs in response to a load release transient as shown at about time t2. In this case, only one hold value is output while Q2 is on and Q2 remains on for a longer period causing VIL to fall to a lower level. Since VIL is on longer, the HOLD signal is held high causing a relatively large discrepancy between HOLD and VIL at time t2. When PWM goes back high, Q2 is turned off and Q1 is turned on so that the HOLD signal still does not change. Eventually, PWM goes low turning Q2 on and a new HOLD value is output so that the HOLD signal jumps to the new DC level.

In summary, HOLD generally follows VIL but significantly deviates from VIL during load transients, including load insertion and load release as illustrated at times t1 and t2.

A predictive current feedback (PCF) network 303 has an input receiving the HOLD signal at the output of the SNH network 301 and another input receiving PWM and has an output providing an OFFSET signal. A combiner (e.g., adder) 305 adds the OFFSET to HOLD to develop a combined signal HOLD+OFFSET. The PCF network 303 is configured to predict the level of VIL based on PWM and HOLD and to generate OFFSET so that the combined signal is a more accurate representation of the inductor current. Various methods are provided for implementing the PCF network 303, including a digital solution and an analog solution.

Figure 4:
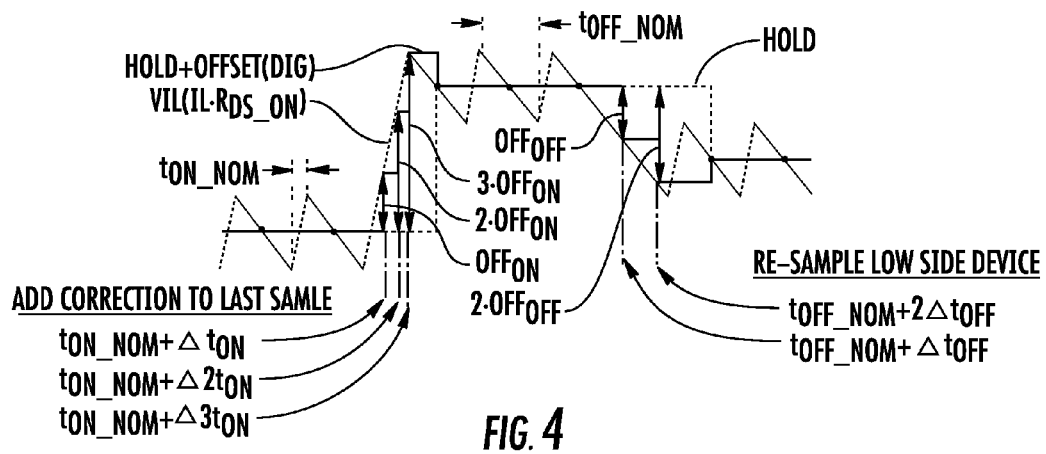
FIG. 4 is a timing diagram plotting the exemplary VIL curve of FIG. 3 along with the combined signal HOLD+ OFFSET for a digital configuration compared with the original HOLD signal.

FIG. 4 is a timing diagram plotting the exemplary VIL curve of FIG. 3 along with the combined signal HOLD+OFFSET for a digital configuration compared with the original HOLD signal. The combined digital signal is shown with a solid line in which deviations of the original HOLD signal are shown with dashed lines. The PCF network 303 monitors the on time of the PWM signal ($t_{ON}$) and compares with a predetermined nominal on time period $t_{ON\_NOM}$. When $t_{ON}$ exceeds $t_{ON\_NOM}$ by an incremental time period $\Delta t_{ON}$ ($t_{ON\_NOM}+\Delta t_{ON}$), it asserts OFFSET to a predetermined incremental offset value $OFF_{ON}$ which is added to HOLD. When PWM remains on for another incremental time period $\Delta t_{ON}$ ($t_{ON\_NOM}+2\Delta t_{ON}$), the OFFSET signal is doubled to twice the offset value $OFF_{ON}$ (2·$OFF_{ON}$) which is added to HOLD to further increase the combined signal by another $OFF_{ON}$ increment. When PWM remains on for another incremental time period $\Delta t_{ON}$ ($t_{ON\_NOM}+3\Delta t_{ON}$), the OFFSET signal is tripled to three times the offset value $OFF_{ON}$ (3·$OFF_{ON}$) which is added to SNH to further increase the combined signal. When PWM goes low and Q2 is finally turned on, the combined signal is held until a new sample is taken.

A similar process may be performed during a subsequent load release transient. The PCF network 303 monitors the off time of the PWM signal ($t_{OFF}$) and compares with a predetermined nominal off time period $t_{OFF\_NOM}$. When $t_{OFF}$ exceeds $t_{OFF\_NOM}$ by an incremental time period $\Delta t_{OFF}$ ($t_{OFF\_NOM}+\Delta t_{OFF}$), it asserts OFFSET to a predetermined incremental offset value $OFF_{OFF}$ which is subtracted from HOLD. When PWM remains off for another incremental time period $\Delta t_{OFF}$ ($t_{OFF\_NOM}+\Delta t_{OFF}$), the OFFSET signal is doubled to twice the offset value $OFF_{OFF}$(2·$OFF_{OFF}$) which is subtracted from HOLD to further decrease the combined signal by another $OFF_{OFF}$ increment. When PWM is next turned on, the process repeats.

In general for the digital configuration, when PWM is on or off longer than a predetermined nominal time period, HOLD is increased or decreased by incremental amounts after incremental on or off time periods of time. In one embodiment, each incremental time period $\Delta t_{ON}$ is fixed and each incremental offset value $OFF_{ON}$ is also fixed so that the adjusted HOLD signal stair-steps up at a fixed rate while PWM is on. The incremental time period and the offsets are configured for a particular configuration. Similarly, each incremental time period $\Delta t_{OFF}$ is fixed and each incremental offset value $OFF_{OFF}$ is also fixed. In another embodiment, the incremental time periods and/or the offset values may be varied. In any case, the time incremental time periods and the corresponding offsets are designed so that the combined signal HOLD+OFFSET tracks VIL more closely than HOLD alone. In one embodiment, the offset values OFFON and OFFOFF may be adaptively set by the modulator 103 based on operating parameters (e.g., the voltage level of VIN) and component values.

Figure 5:
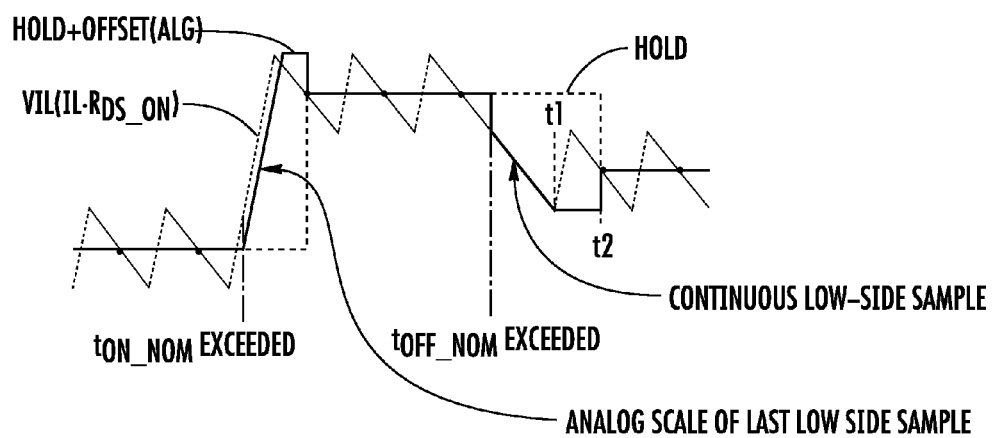
FIG. 5 is a timing diagram plotting VIL and the combined signal HOLD+OFFSET for an analog configuration compared with the original HOLD signal.

FIG. 5 is a timing diagram plotting VIL and the combined signal HOLD+OFFSET for an analog configuration compared with the original HOLD signal. The combined analog signal is shown with a solid line in which deviations of the original HOLD signal are shown with dashed lines. In one embodiment, once the on time of PWM exceeds the predetermined nominal on time period $t_{ON\_NOM}$, such as in response to a load insertion transient, the OFFSET signal is ramped up based on an analog scale of the last low side sample, so that the HOLD+OFFSET ramps up at an estimated rate of VIL until PWM is turned off. After PWM is turned off, normal sample and hold operation continues while $t_{ON\_NOM}$ and a predetermined nominal off time period $t_{OFF\_NOM}$ are not exceeded. When the off time of PWM exceeds the predetermined nominal off time period $t_{OFF\_NOM}$, such as in response to a load release transient, the SNH network 301 operates in a track and hold mode tracking VIL until PWM is next asserted. When PWM is next asserted at a time t1, the hold value is held at that level until the next hold value is output while PWM is off as shown at a time t2 during normal sample and hold operation.

Figure 6:
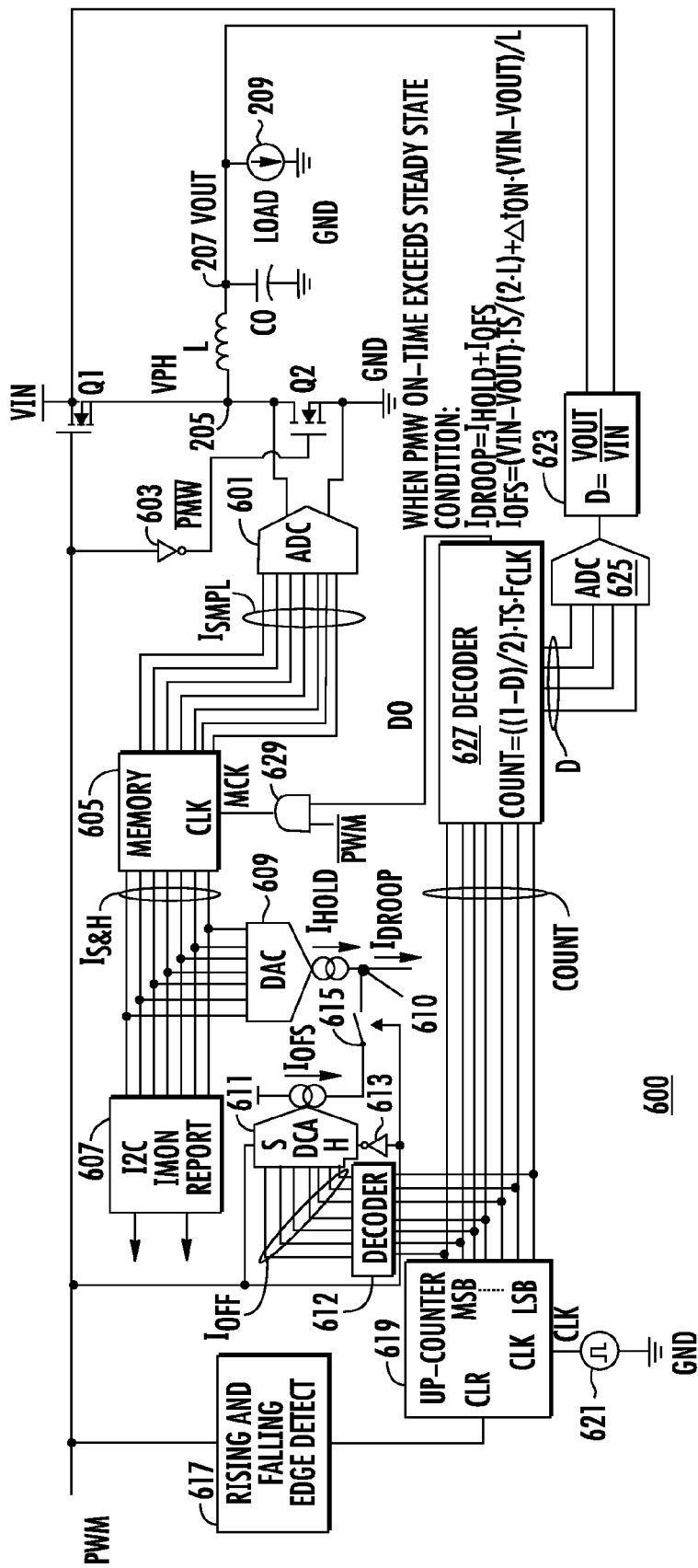
FIG. 6 is a simplified schematic and block diagram of a predictive current feedback system implemented according to an embodiment of the present invention.

FIG. 6 is a simplified schematic and block diagram of a predictive current feedback system 600 implemented according to an embodiment of the present invention. PWM is shown driving the gate of Q1 and is inverted by an inverter 603 providing an inverted version of PWM at its output, or $\overline{PWM}$, to the gate of Q2. This is a simplified and functional depiction of operation, in which a gate driver, such as the gate driver 203, is typically used to drive the power switches. An analog to digital converter (ADC) 601 samples the phase voltage VPH (or VIL) across Q2 while PWM is low. The ADC 601 provides a digital current sample value $I_{SMPL}$ at its output, which is provided to the input of a memory 605. The memory 605 is clocked by a memory clock signal MCK at the output of a 2-input AND gate 629 receiving $\overline{PWM}$ and a signal DO at its inputs. $\overline{PWM}$ is provided by the output of the inverter 603 or by the output of another inverter 613. When DO is asserted high while $\overline{PWM}$ is high, the memory 605 holds the value of $I_{SMPL}$ received at its input as a digital current hold value $I_{S\&H}$ at its output. $I_{S\&H}$ is provided to the input of an I2C IMON report block 607 for reporting the held version of the inductor current without correction to an external device.

A digital to analog converter (DAC) 609 receives $I_{S\&H}$ at its input (or corresponding digital inputs) and provides an analog current value $I_{HOLD}$ at its output to a current summing node 610. $I_{S\&H}$ (digital) and $I_{HOLD}$ (analog) correspond with the HOLD signal previously described. Node 610 outputs a droop current $I_{DROOP}$ which is provided to a droop network (not shown) for performing the droop function. As understood by those of ordinary skill in the art, the droop function is an intentional adjustment of the voltage level of the output voltage VOUT as a function of load. It is desired to provided a more accurate representation of VIL than that provided by $I_{HOLD}$. As further described herein, $I_{DROOP}$ is adjusted by an offset current $I_{OFS}$ based on predictive current feedback for providing a more accurate representation of the inductor current IL. Thus, $I_{DROOP}=I_{HOLD}+I_{OFS}$ in which $I_{DROOP}$ represents the combined signal HOLD+OFFSET(DIG) previously described. It is noted that $I_{OFS}$ is zero for lower values of COUNT as further described herein.

PWM is provided to the input of an edge detect block 617 having an output provided to the clear (CLR) input of an up-counter 619. The up-counter 619 has a clock input (CLK) receiving a clock signal CLK with frequency $F_{CLK}$ provided by a clock generator 621. In one embodiment, CLK is an oversampling clock having a corresponding oversampling frequency, e.g., $F_{CLK}$=50 MHz, although alternative clock frequencies are contemplated. Thus, the up-counter 619 is cleared on both rising and falling edges of PWM and counts up (from a predetermined minimum value or zero) at a rate determined by $F_{CLK}$ and provides a digital output value COUNT. COUNT is provided to a decoder 612, having outputs providing a digital offset value $I_{OFF}$ to respective inputs of another DAC 611. The DAC 611 has a sample input receiving PWM, a hold input receiving $\overline{PWM}$ (via the inverter 613), and an analog current output providing an analog offset current signal $I_{OFS}$, which is an analog version of $I_{OFF}$. A switch 615 is closed when PWM is asserted high and provides the current $I_{OFS}$ to node 610 when closed. $I_{DROOP}$ is determined as $I_{HOLD}$ plus $I_{OFS}$ when PWM is asserted high and $I_{HOLD}$ when PWM is low (when switch 615 is opened).

The digital COUNT value is provide to an input of a decoder 627, which receives a digital version of a duty cycle value D at another input. A block 623 detects the input voltage VIN and the output voltage VOUT and determines an analog version of the duty cycle as D=VOUT/VIN. The output of block 623 is provided to the input of an ADC 625, which provides the digital version of D to the decoder 627. In the embodiment illustrated, the decoder 627 pulses DO high at its output to the AND gate 629 when COUNT=((1−D)/2)· TS·$F_{CLK}$, where TS is the switching period of the regulator 102.

Generally, the up counter 619 is used to provide COUNT indicative of the duration of the pulse width of PWM while it is on (e.g., high) and while it is off (e.g., low). The decoder 627 uses COUNT to determine an appropriate hold time (e.g., such as the mid-point) of the low-time of PWM (while PWM is low) and while Q2 is on to clock the memory 605 to hold a sampled value $I_{SMPL}$ as $I_{S\&H}$ indicative of the inductor current. While PWM is high, the decoder 612 uses COUNT to track $t_{ON\_NOM}$ and $\Delta t_{ON}$ and to assert $I_{OFF}$ to a suitable level to adjust the droop current $I_{DROOP}$ by a suitable offset amount $I_{OFS}$. When PWM exceeds the nominal time amount $t_{ON\_NOM}$ which occurs when the up counter 619 reaches a nominal count value as determined by the decoder 612, $I_{OFS}$ is adjusted according to the following equation: $I_{OFS}$=(VIN−VOUT)·TS/(2·L)+$\Delta t_{ON}$·(VIN−VOUT)/L in which "L" is the inductance of the output inductor L and $\Delta t_{ON}$ is a fixed incremental time period similar to that previously described.

Figure 7:
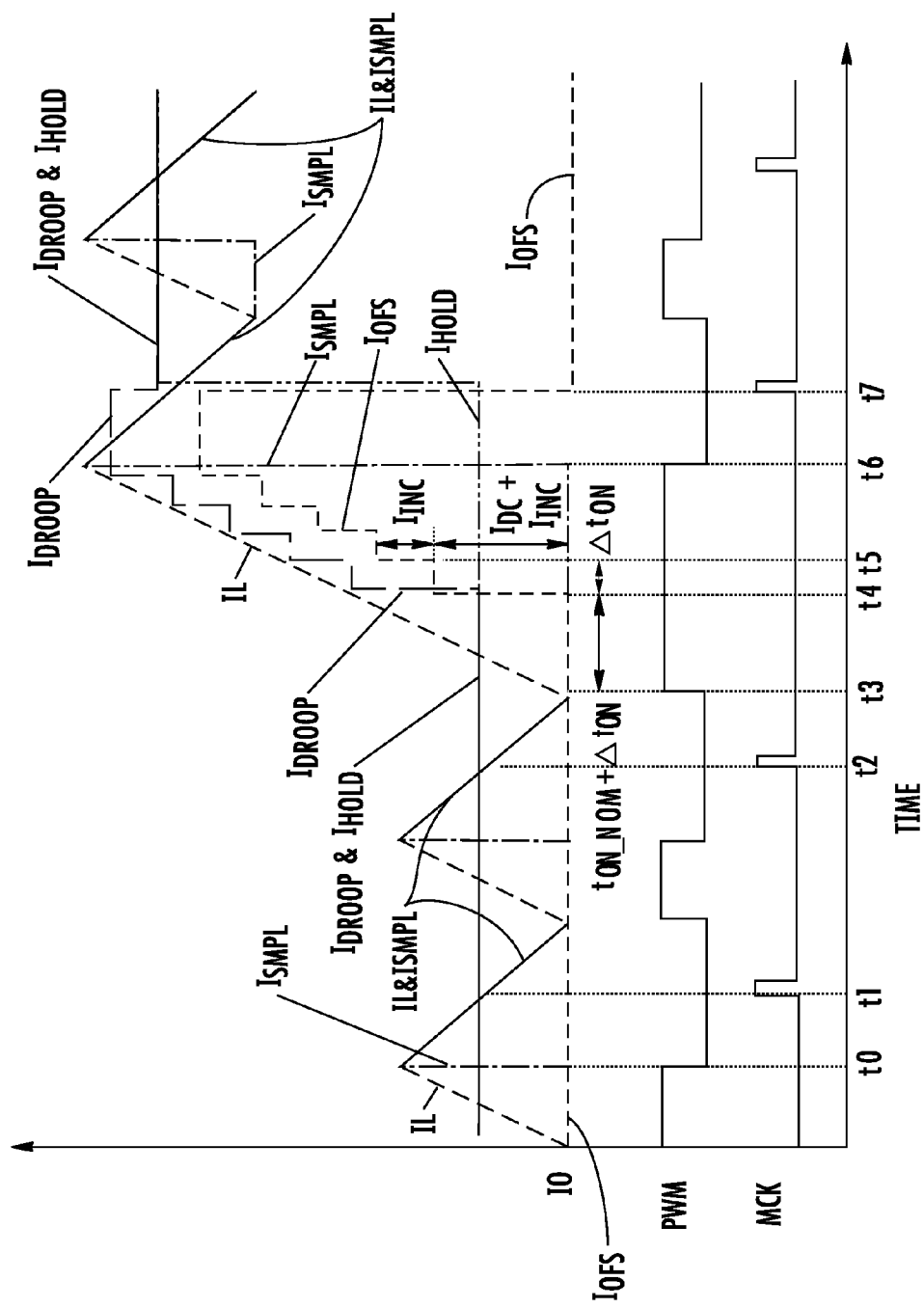
FIG. 7 is a timing diagram plotting the inductor current signal IL (corresponding with VIL), $I_{SMPL}$, $I_{HOLD}$, $I_{OFS}$ and $I_{DROOP}$ superimposed upon each other relative to a zero level shown as I0, along with the PWM and MCK signals, all versus time.

FIG. 7 is a timing diagram plotting the inductor current signal IL (corresponding with VIL), $I_{SMPL}$, $I_{HOLD}$, $I_{OFS}$ and $I_{DROOP}$ superimposed upon each other relative to a zero level shown as I0, along with the PWM and MCK signals, all versus time. When PWM is high, IL ramps up until PWM goes low, such as shown at initial time t0, in which IL ramps back down. When PWM goes low at time t0, the sampled value $I_{SMPL}$ of the inductor current jumps to reflect the level of IL. While PWM is low (so that $\overline{PWM}$ is high) and IL is ramping down, the $I_{SMPL}$ value tracks IL. When COUNT= ((1−D)/2)·TS·$F_{CLK}$ while PWM is low, such as shown at a time t1, the decoder 627 pulses DO high which also pulses MCK high at time t1. The memory 605 asserts $I_{S\&H}$ as the held value of $I_{SMPL}$ at time t1, and the current $I_{HOLD}$ maintains a value indicative of $I_{S\&H}$ (and thus the held value of $I_{SMPL}$ at time t1) for the remainder of the cycle. Operation repeats in this manner in the next cycle as shown at time t2 in which MCK is pulsed again to hold $I_{S\&H}$ at the value of $I_{SMPL}$ at time t2. In this manner, $I_{HOLD}$ generally tracks the average value of IL without load transients while the on time $t_{ON}$ of PWM does not exceed $t_{ON\_NOM}$. The current $I_{DROOP}$ generally follows $I_{HOLD}$ during this time.

The PWM signal goes high again at time t3, and in this cycle PWM remains on longer than $t_{ON\_NOM}$ by the incremental time $\Delta t_{ON}$ at time t4 indicative of a load insertion transient. Time t4 is a time of $t_{ON\_NOM}$+$\Delta t_{ON}$ relative to time t3. At time t4, $I_{OFS}$ is increased by an amount $I_{DC}$+$I_{INC}$, in which $I_{DC}$ is an initial DC amount indicative of $I_{HOLD}$ and $I_{INC}$ is an incremental current level. Thus at time t4, $I_{DROOP}$ jumps from the level of $I_{HOLD}$ to a higher value of $I_{HOLD}$+ $I_{DC}$+$I_{INC}$ which is about the same level of IL at time t4. While PWM remains on for each additional incremental time $\Delta t_{ON}$, another incremental current amount $I_{INC}$ is added to $I_{OFS}$ as shown at time t5. $I_{DROOP}$ increases by the same amount since $I_{DROOP}$=$I_{HOLD}$+$I_{OFS}$. Thus, $I_{DROOP}$ and $I_{OFS}$ both increase in a stair-step fashion while PWM remains high, while $I_{HOLD}$ remains constant at the last held value of $I_{SMPL}$. Thus, $I_{DROOP}$ is incrementally increased to track IL more closely than $I_{HOLD}$.

At subsequent time t6, PWM finally goes low so that IL begins to ramp low again. $I_{SMPL}$ jumps up to the new level of IL and tracks IL as it ramps down as previously described. $I_{DROOP}$ is temporarily held constant close to the peak level of IL until MCK is again pulsed high at time t7. At time t7, $I_{OFS}$ goes back low to I0, $I_{HOLD}$ jumps to the new level of IL (which is the level of $I_{SMPL}$ at time t7), and $I_{DROOP}$ jumps down to the level of $I_{HOLD}$. $I_{HOLD}$, and thus $I_{DROOP}$, both track the average level of IL until the next load transient event.

At time t6, IL deviates from $I_{HOLD}$ by a significant amount so that $I_{HOLD}$ temporarily does not accurately reflect IL until subsequent time t7. The addition of $I_{OFS}$ to $I_{HOLD}$ enables $I_{DROOP}$ to track IL more accurately between times t4 to t7 as illustrated. Although not explicitly shown in FIG. 7, a similar operation occurs in response to a load release transient, in which case $I_{OFS}$ stair-steps in a negative direction to decrease $I_{DROOP}$ relative to $I_{HOLD}$ to track IL more accurately.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A predictive current feedback system for a switched mode regulator, comprising:
   a sample and hold network for sampling a voltage across a power switch of the regulator and for providing a hold signal indicative thereof; and
   a predictive current feedback network which adds an offset adjustment to said hold signal based on a duration of a pulse width of a pulse control signal developed by the regulator; and wherein said offset adjustment comprises a predetermined incremental offset adjustment for each of a predetermined incremental time period during said pulse width.

2. The predictive current feedback system of claim 1, wherein said predictive current feedback network adjusts said hold signal to provide a more accurate determination of current through an output inductor of the regulator.

3. The predictive current feedback system of claim 1, wherein the pulse control signal toggles on and off, wherein said predictive current feedback network adds a first offset amount to said hold signal after each of at least one first incremental time period after a first nominal time period while the pulse control signal is on, and wherein said predictive current feedback network subtracts a second offset amount from said hold signal after each of at least one second incremental time period after a second nominal time period while the pulse control signal is off.

4. The predictive current feedback system of claim 1, wherein the pulse control signal toggles on and off, wherein said predictive current feedback network adds a time varying signal to said hold signal after a first nominal time period while the pulse control signal is on, and wherein said sample and hold network tracks the voltage across the power switch after a second nominal time period while the pulse control signal is off.

5. An electronic device, comprising:
a modulator which receives an output voltage sense signal and a current sense signal and which develops a pulse control signal indicative thereof for controlling a switching regulator for regulating an output voltage;
a sample and hold network for sampling voltage of a phase node of said switching regulator and for providing a hold signal indicative thereof;
a predictive current feedback network which provides an offset adjustment to adjust said hold signal based on a duration of a pulse width of said pulse control signal to develop said current sense signal; and
wherein said predictive current feedback network is configured to incrementally add an offset to said hold signal for each of an incremental time period after a nominal time period while said pulse control signal is high.

6. The electronic device of claim 5, further comprising:
an output node developing said output voltage; and
a load coupled to said output node.

7. The electronic device of claim 6, wherein said load comprises a processor coupled to a memory.

8. The electronic device of claim 5, wherein:
said switching regulator comprises:
an upper switch coupled between an input voltage node and said phase node;
a lower switch coupled between said phase node and a reference node;
an output inductor coupled between said phase node and an output node developing said output voltage; and
wherein said upper switch is turned on while said pulse control signal is high and wherein said lower switch is turned on while said pulse control signal is low; and
wherein said sample and hold network samples voltage across said lower switch while said pulse control signal is low and develops said hold signal indicative thereof.

9. A method of providing predictive current feedback for a switched mode regulator, comprising:
sampling voltage across a power switch during a first state of a pulse control signal and providing a hold value indicative thereof; and
adding an offset to said hold value during a second state of the pulse control signal in response to a load transient, wherein said adding an offset comprises adding a first offset value after each of a first incremental time period after a first nominal time period during the second state of the pulse control signal.

10. The method of claim 9, further comprising subtracting a second offset value from said hold value after each of a second incremental time period after a second nominal time period during the first state of the pulse control signal.

11. The method of claim 9, wherein said providing a hold value and said adding an offset to said hold value comprises generating a droop control signal for controlling output voltage droop based on load.

12. A predictive current feedback system for a switched mode regulator, comprising:
a sample and hold network for sampling a voltage across a power switch of the regulator and for providing a hold signal indicative thereof; and
a predictive current feedback network that adds an offset amount to said hold signal after each of at least one incremental time period after a nominal time period during a pulse width of a pulse control signal developed by the regulator.

13. A predictive current feedback system for a switched mode regulator, comprising:
a sample and hold network for sampling a voltage across a power switch of the regulator and for providing a hold signal indicative thereof;
a predictive current feedback network that adds an offset adjustment to said hold signal based on a duration of a pulse width of a pulse control signal developed by the regulator;
a counter network that provides a count value indicative of an on time duration and an off time duration of the pulse control signal;
wherein said sample and hold network comprises a first decoder which determines when to hold a sampled value while the pulse control signal is off based on said count signal during said off time duration; and
wherein said predictive current feedback network comprises a second decoder which determines when said on time duration of the pulse control signal exceeds each of an incremental time period after a predetermined nominal time period based on said count value and provides a corresponding offset value indicative thereof.

14. The predictive current feedback system of claim 13, wherein:
said sample and hold network comprises:
a first converter which converts voltage across the power switch to sample values;
a memory which receives said sample values and provides a hold value in response to a hold indication from said first decoder; and
a second converter which converts said hold value to a hold current; and
wherein said predictive current feedback network comprises a third converter which converts said offset value to an offset current which is added to said hold current during said on time duration of the pulse control signal.

15. A method of providing predictive current feedback for a switched mode regulator, comprising:
sampling voltage across a power switch during a first state of a pulse control signal and providing a hold value indicative thereof;
adding an offset to said hold value during a second state of the pulse control signal in response to a load transient, wherein said adding an offset comprises adding a time-varying offset value to the hold value for after a first nominal time period during the second state of the pulse control signal; and
tracking voltage of the phase node after a second nominal time period during the first state of the pulse control signal to adjust the hold value.

* * * * *